United States Patent
Ruan

(10) Patent No.: US 11,228,423 B2
(45) Date of Patent: Jan. 18, 2022

(54) METHOD AND DEVICE FOR SECURITY ASSESSMENT OF ENCRYPTION MODELS

(71) Applicant: ADVANCED NEW TECHNOLOGIES CO., LTD., Grand Cayman (KY)

(72) Inventor: Fangyuan Ruan, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/836,725

(22) Filed: Mar. 31, 2020

(65) Prior Publication Data

US 2020/0244437 A1 Jul. 30, 2020

Related U.S. Application Data

(63) Continuation of application No. PCT/CN2020/071605, filed on Jan. 12, 2020.

(51) Int. Cl.
*H04L 9/06* (2006.01)
*H04L 9/00* (2006.01)
(Continued)

(52) U.S. Cl.
CPC .......... *H04L 9/0618* (2013.01); *G06K 9/6256* (2013.01); *H04L 9/008* (2013.01);
(Continued)

(58) Field of Classification Search
CPC ..... H04L 9/0618; H04L 9/008; H04L 9/0869; H04L 63/1433; H04L 9/0825; H04L 63/145; H04L 63/0442; G06K 9/6256
See application file for complete search history.

(56) References Cited

U.S. PATENT DOCUMENTS

| 7,137,012 B1 | 11/2006 | Kamibayashi et al. |
| 7,613,921 B2 | 11/2009 | Scaralata |

(Continued)

FOREIGN PATENT DOCUMENTS

| CN | 102750510 A | 10/2012 |
| CN | 106910057 A | 6/2017 |

(Continued)

OTHER PUBLICATIONS

Written Opinion and International Search Report for PCT Application No. PCT/CN2020/071605 dated Apr. 14, 2020.
(Continued)

*Primary Examiner* — Meng Li

(57) ABSTRACT

A method includes: a first device sending to a second device a deployment request for deploying a homomorphically-encrypted data model on the second device, wherein the deployment request comprises ciphertext model parameters and a public key for the homomorphic encryption; the second device obtaining a first ciphertext security assessment index through computation using the ciphertext model parameters, and sending the same to the first device; the first device decrypting the received first ciphertext security assessment index using a private key corresponding to the public key to generate a plaintext security assessment index, and forwarding the plaintext security assessment index to the second device; and the second device encrypting the plaintext security assessment index using the public key to generate a second ciphertext security assessment index, comparing both indices to determine consistency for determining whether to deploy the homomorphically-encrypted data model.

15 Claims, 6 Drawing Sheets

US 11,228,423 B2
Page 2

(51) Int. Cl.
*G06K 9/62* (2006.01)
*H04L 9/08* (2006.01)
*H04L 29/06* (2006.01)

(52) U.S. Cl.
CPC .......... *H04L 9/0825* (2013.01); *H04L 9/0869* (2013.01); *H04L 63/1433* (2013.01)

(56) References Cited

U.S. PATENT DOCUMENTS

| | | | |
|---|---|---|---|
| 7,743,260 B2 | 6/2010 | Fetik | |
| 8,055,910 B2 | 11/2011 | Kocher et al. | |
| 8,230,230 B2 | 7/2012 | Bondurant | |
| 8,296,585 B2 | 10/2012 | Cai et al. | |
| 8,335,931 B2 | 12/2012 | Lee et al. | |
| 8,468,345 B2 | 6/2013 | Auradkar et al. | |
| 9,054,874 B2 | 6/2015 | Hsien | |
| 9,519,787 B2 | 12/2016 | Novak et al. | |
| 9,537,650 B2 | 1/2017 | Auradkar et al. | |
| 10,015,164 B2 | 7/2018 | Hamburg et al. | |
| 10,164,953 B2 | 12/2018 | Golla et al. | |
| 10,180,809 B2 | 1/2019 | Fetik | |
| 10,348,693 B2 | 7/2019 | Auradkar et al. | |
| 2007/0140479 A1 | 6/2007 | Wang et al. | |
| 2007/0179891 A1 | 8/2007 | Lu et al. | |
| 2008/0052539 A1 | 2/2008 | MacMillan et al. | |
| 2009/0031133 A1 | 1/2009 | Bar-El | |
| 2010/0042845 A1 | 2/2010 | Kobayashi et al. | |
| 2010/0325446 A1 | 12/2010 | Mordetsky et al. | |
| 2011/0264923 A1 | 10/2011 | Kocher et al. | |
| 2012/0233712 A1 | 9/2012 | Falk et al. | |
| 2013/0275752 A1 | 10/2013 | Zhang et al. | |
| 2015/0310189 A1 | 10/2015 | Lin | |
| 2016/0277373 A1 | 9/2016 | Murray | |
| 2018/0089389 A1* | 3/2018 | Hu | G16H 50/50 |
| 2018/0239922 A1* | 8/2018 | Furuichi | G06F 21/6218 |
| 2019/0044715 A1 | 2/2019 | Hunacek | |
| 2019/0097985 A1 | 3/2019 | Torres et al. | |
| 2019/0149564 A1* | 5/2019 | McLean | H04L 63/1416 713/171 |
| 2019/0246275 A1* | 8/2019 | Nakarmi | H04W 12/02 |
| 2019/0273607 A1* | 9/2019 | Van Der Velden | G06K 7/1417 |
| 2020/0244435 A1* | 7/2020 | Shpurov | H04L 9/3218 |
| 2020/0252198 A1* | 8/2020 | Nandakumar | G06N 20/00 |

FOREIGN PATENT DOCUMENTS

| | | |
|---|---|---|
| CN | 107104987 A | 8/2017 |
| CN | 108898475 A | 11/2018 |
| CN | 109033854 A | 12/2018 |
| CN | 109190876 A | 1/2019 |
| CN | 110113203 A | 8/2019 |
| WO | 2010089673 A2 | 8/2010 |

OTHER PUBLICATIONS

First Search for Chinese Application No. 201910365011.2 dated May 25, 2021.

* cited by examiner

METHOD AND DEVICE FOR SECURITY ASSESSMENT OF ENCRYPTION MODELS

CROSS REFERENCE TO RELATED APPLICATIONS

This application is a continuation application of International Patent Application No. PCT/CN2020/071605, filed on Jan. 12, 2020, which claims priority to and benefits of Chinese Patent Application No. 201910365011.2 filed on Apr. 30, 2019. The contents of the above-referenced applications are incorporated herein by reference in their entirety.

TECHNICAL FIELD

The specification relates to the technical field of security of encryption models, and in particular, to a security deployment assessment solution for encryption models.

BACKGROUND

With the continuous development of Internet technology and the emergence of the cloud computing concept, more and more companies and users tend to use the Internet for data communication. As a result, many companies establish various data models on their platforms to process various types of data from various sources. The processing comprises various data operations such as receiving, computation, updating, storage, and sending data. For example, a widely used data model is a machine learning model which can obtain new knowledge or skills by simulating or implementing human learning behaviors, and reorganize existing knowledge structures to continuously improve its performance. The machine learning model is the core of artificial intelligence and a key technology for enabling a computer to be artificially intelligent, the application of which covers all areas of artificial intelligence. The machine learning model data mainly uses induction and synthesis of data, rather than deduction of data. Data models can be classified into unencrypted data models (plaintext data models) and encrypted data models (ciphertext data models). When a data model is deployed, security assessment of the model is required. Regarding a plaintext data model, the security thereof can be determined directly, but the privacy of a data demand party cannot be protected. On the other hand, regarding a ciphertext data model, the privacy of the data demand party is protected, but it becomes difficult for a data source party that plans for the deployment to directly assess the security of the model. Therefore, the need to improve a model security deployment solution calls for a more secure and robust model security deployment assessment mechanism.

SUMMARY

The specification relates to a security deployment assessment solution for encryption models. The solution achieves security assessment of encryption models using a homomorphic encryption technology. Thus, there is no risk of leaking a plaintext model parameter.

According to a first aspect of the specification, a data demand party device for security assessment of encryption models is provided. The data demand party device is configured to: send to a data source party device a deployment request for deploying a homomorphically-encrypted data model on the data source party device, wherein the deployment request comprises one or more ciphertext model parameters that are generated based on encrypting, with homomorphic encryption, one or more plaintext parameters of the data model and a public key for the homomorphic encryption; receive a first ciphertext security assessment index from a security assessment party device; and decrypt the received first ciphertext security assessment index using a private key corresponding to the public key to generate a plaintext security assessment index, and forward the plaintext security assessment index to the security assessment party device.

According to a second aspect of the specification, a data source party device for security assessment of encryption models is provided. The data source party device is configured to: receive, from a data demand party device, a deployment request for deploying a homomorphically-encrypted data model on the data source party device, wherein the deployment request comprises ciphertext model parameters and a public key for the homomorphic encryption; forward the ciphertext model parameters and the public key to a security assessment party device; receive a model security assessment report from the security assessment party device, and perform an examining and approval step to decide whether to deploy the homomorphically-encrypted data model provided by the data demand party device according to the model security assessment report.

In some embodiments, the data source party device according to the second aspect is further configured to: before forwarding the ciphertext model parameters and the public key to the security assessment party device, shuffle an order of the ciphertext model parameters.

According to a third aspect of the specification, a security assessment party device for security assessment of encryption models is provided. The security assessment party device is configured to: receive a ciphertext model parameter and a public key forwarded by a data source party device and provided by a data demand party device; obtain a first ciphertext security assessment index through computation using the ciphertext model parameter, and send the first ciphertext security assessment index to the data demand party device; receive a plaintext security assessment index from the data demand party device; encrypt the received plaintext security assessment index using the public key provided by the data demand party device to generate a second ciphertext security assessment index; compare the first ciphertext security assessment index with the second ciphertext security assessment index to determine consistency thereof, and generate a corresponding model security assessment report based on the consistency; and send the model security assessment report to the data source party device.

According to a fourth aspect of the specification, a method for security assessment of encryption models is provided. The method comprises: a data demand party device sends to a data source party device a deployment request for deploying a homomorphically-encrypted data model on the data source party device, wherein the deployment request comprises one or more ciphertext model parameters that are generated based on encrypting, with homomorphic encryption, one or more plaintext parameters of the data model and a public key for the homomorphic encryption; the data source party device forwards the ciphertext model parameters and the public key to a security assessment party device; the security assessment party device obtains a first ciphertext security assessment index through computation using the received ciphertext model parameter, and sends the first ciphertext security assessment index to the data demand party device; the data demand party device decrypts the received first ciphertext security assessment index using a private key corresponding to the public key to generate a plaintext security assessment index, and forwards the plaintext security assessment index to the security assessment party device; the security assessment party device encrypts the received plaintext security assessment index using the public key provided by the data demand party device to generate a second ciphertext security assessment index, compares the first ciphertext security assessment index with the second ciphertext security assessment index to determine consistency thereof, generates a corresponding model security assessment report based on the consistency, and sends the model security assessment report to the data source party device; and the data source party device determinings whether to deploy the homomorphically-encrypted data model provided by the data demand party device according to the received model security assessment report.

In some embodiments, the method according to the fourth aspect further comprises: before the data demand party device sends the deployment request to the data source party device, training the data model using data from various sources as a model feature, and performing homomorphic encryption on the model parameter to obtain an encrypted data model.

In some embodiments, the method according to the fourth aspect further comprises: in the event of a plurality of assessments, generating a comprehensive model security assessment report by means of comprehensively considering comparison results of a plurality of the first ciphertext security assessment indices and the second ciphertext security assessment indices.

In some embodiments, the method according to the fourth aspect may alternatively be executed after the homomorphically-encrypted data model has been deployed on the data source party device, so as to evaluate whether there is a risk that a plaintext model result provided by the data demand party may be used to reversely infer a detailed data value of the data source party.

In some embodiments, the method according to the fourth aspect further comprises: in the decryption step, before sending the plaintext security assessment index to the security assessment party, the data demand party can perform verification by comparing a decrypted variance Var with a Var computed according to a plaintext to avoid leaking a model parameter.

In some embodiments, the method according to the fourth aspect further comprises: a random number is further provided along with the public key, so as to enable that using same public key results in a consistent encryption result for the same data under a condition of the same random number.

According to a fifth aspect of the specification, a data demand party device for security assessment of encryption models is provided. The data demand party device is configured to: send to a data source party device a deployment request for deploying a homomorphically-encrypted data model on the data source party device, wherein the deployment request comprises one or more ciphertext model parameters that are generated based on encrypting, with homomorphic encryption, one or more plaintext parameters of the data model and a public key for the homomorphic encryption; receive a first ciphertext safety assessment index from the data source party device; and decrypt the received first ciphertext safety assessment index using a private key corresponding to the public key to generate a plaintext safety assessment index, and forward the plaintext security assessment index to the data source party device.

According to a sixth aspect of the specification, a data source party device for security assessment of encryption models is provided. The data source party device is configured to: receive, from a data demand party device, a deployment request for deploying a homomorphically-encrypted data model on the data source party device, wherein the deployment request comprises a ciphertext model parameter and a public key for the homomorphic encryption; obtain a first ciphertext security assessment index through computation using the ciphertext model parameter, and send the first ciphertext security assessment index to the data demand party device; receive a plaintext security assessment index from the data demand party device; encrypt the received plaintext security assessment index using the public key provided by the data demand party device to generate a second ciphertext security assessment index; compare the first ciphertext security assessment index with the second ciphertext security assessment index to determine consistency thereof, and generate a corresponding model security assessment report based on the consistency; and perform an examining and approval step to decide whether to deploy the homomorphically-encrypted data model provided by the data demand party device according to the model security assessment report.

According to a seventh aspect of the specification, a method for security assessment of encryption models is provided. The method comprises: a data demand party device sends to a data source party device a deployment request for deploying a homomorphically-encrypted data model on the data source party device, wherein the deployment request comprises one or more ciphertext model parameters that are generated based on encrypting, with homomorphic encryption, one or more plaintext parameters of the data model and a public key for the homomorphic encryption; the data source party device obtains a first ciphertext security assessment index through computation using the received ciphertext model parameter, and sends the first ciphertext security assessment index to the data demand party device; the data demand party device decrypts the received first ciphertext security assessment index using a private key corresponding to the public key to generate a plaintext security assessment index, and forwards the plaintext security assessment index to the data source party device; the data source party device encrypts the received plaintext security assessment index using the public key provided by the data demand party device to generate a second ciphertext security assessment index, compares the first ciphertext security assessment index with the second ciphertext security assessment index to determine consistency thereof, and generates a corresponding model security assessment report based on the consistency; and the data source party device determinings whether to deploy the homomorphically-encrypted data model provided by the data demand party device according to the model security assessment report.

In some embodiments, the method according to the seventh aspect further comprises: before the data demand party device sends the deployment request to the data source party device, training the data model using data from various sources as a model feature, and performing homomorphic encryption on the model parameter to obtain an encrypted data model.

In some embodiments, the method according to the seventh aspect further comprises: in the event of a plurality of assessments, generating a comprehensive model security assessment report by means of comprehensively considering comparison results of a plurality of the first ciphertext security assessment indices and the second ciphertext security assessment indices.

In some embodiments, the method according to the seventh aspect may alternatively be executed after the homomorphically-encrypted data model has been deployed on the data source party device, so as to evaluate whether there is a risk that a plaintext model result provided by a data demand party may be used to reversely infer a detailed data value of the data source party.

In some embodiments, the method according to the seventh aspect comprises: a random number is further provided along with the public key, so as to enable that using same public key results in a consistent encryption result for the same data under a condition of the same random number.

According to an eighth aspect of the specification, a system for security assessment of encryption models is provided. The system comprises a first device and a second device, each of the first device and the second device comprising at least one processor. The first device is configured for sending to a second device a deployment request for deploying a homomorphically-encrypted data model on the second device, wherein the deployment request comprises one or more ciphertext model parameters that are generated based on encrypting, with homomorphic encryption, one or more plaintext parameters of a data model and comprises a public key for the homomorphic encryption. The second device is configured for obtaining a first ciphertext security assessment index through computation using the one or more ciphertext model parameters, and sending the first ciphertext security assessment index to the first device. The first device is configured for decrypting the received first ciphertext security assessment index using a private key corresponding to the public key to generate a plaintext security assessment index, and forwarding the plaintext security assessment index to the second device. The second device is configured for encrypting the plaintext security assessment index using the public key to generate a second ciphertext security assessment index, comparing the first ciphertext security assessment index with the second ciphertext security assessment index to determine consistency thereof, generating a model security assessment report based on the consistency, and determining whether to deploy the homomorphically-encrypted data model according to the model security assessment report.

According to a nineth aspect of the specification, a non-transitory computer-readable storage medium is provided. The non-transitory computer-readable storage medium stores instructions executable by one or more processors to cause the one or more processors to perform operations including: a first device sending to a second device a deployment request for deploying a homomorphically-encrypted data model on the second device, wherein the deployment request comprises one or more ciphertext model parameters that are generated based on encrypting, with homomorphic encryption, one or more plaintext parameters of a data model and comprises a public key for the homomorphic encryption; the second device obtaining a first ciphertext security assessment index through computation using the one or more ciphertext model parameters, and sending the first ciphertext security assessment index to the first device; the first device decrypting the received first ciphertext security assessment index using a private key corresponding to the public key to generate a plaintext security assessment index, and forwarding the plaintext security assessment index to the second device; and the second device encrypting the plaintext security assessment index using the public key to generate a second ciphertext security assessment index, comparing the first ciphertext security assessment index with the second ciphertext security assessment index to determine consistency thereof, generating a model security assessment report based on the consistency, and determining whether to deploy the homomorphically-encrypted data model according to the model security assessment report.

According to a nineth aspect of the specification, a method for security assessment of encryption models is provided. A first device sends to a second device a deployment request for deploying a homomorphically-encrypted data model on the second device. The deployment request comprises one or more ciphertext model parameters that are generated based on encrypting, with homomorphic encryption, one or more plaintext parameters of the data model and comprises a public key for the homomorphic encryption. The second device forwards the one or more ciphertext model parameters and the public key to a security assessment device. The first device obtains a first ciphertext security assessment index that is generated by the security assessment device using the one or more ciphertext model parameters and the public key. The first device decrypts the first ciphertext security assessment index using a private key corresponding to the public key to generate a plaintext security assessment index, and forwards the plaintext security assessment index to the security assessment device. The second device obtains a model security assessment report from the security assessment device. The model security assessment report is generated by the security assessment device encrypting the plaintext security assessment index using the public key to generate a second ciphertext security assessment index and comparing the first ciphertext security assessment index with the second ciphertext security assessment index to determine consistency thereof. The second device determines whether to deploy the homomorphically-encrypted data model according to the model security assessment report.

This summary is provided to introduce, in a simplified way, some concepts that are further described below in the detailed description. This summary is not intended to identify key features or essential features of the claimed subject matter, nor to limit the scope of the claimed subject matter.

BRIEF DESCRIPTION OF DRAWINGS

Manners in which the above-described and other advantages and features that the specification can achieve and this briefly described specification above will be more specifically described by reference to specific embodiments of the specification illustrated in the accompanying drawings. It can be understood that these accompanying drawings depict only typical embodiments of the specification and thus are not considered to limit the scope of the specification. The specification is described and explained using the accompanying drawings and utilizing additional features and details. In the accompanying drawings.

DETAILED DESCRIPTION OF EMBODIMENTS

Figure 1:
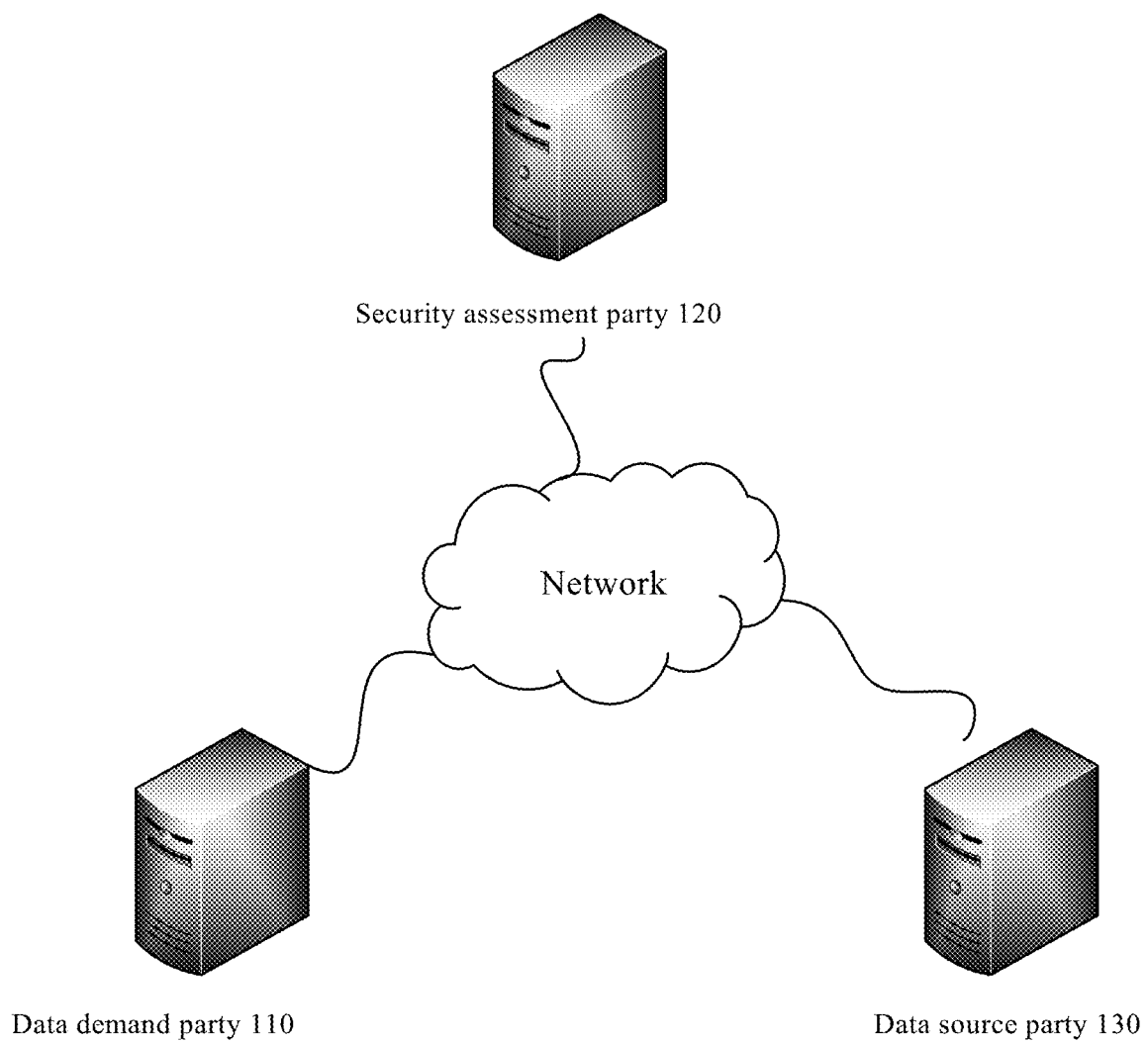
FIG. 1 shows an exemplary operational computing environment of the specification.

Firstly, in order to resolve a conflict between security and privacy in deployment of a data model, before deployment of an encrypted data model in a traditional model security deployment solution, a trusted assessment party is provided as a third-party assessment agency to perform an examining and approval step to decide whether the to-be-deployed encrypted data model is secure. The trusted assessment party can obtain a plaintext model parameter from a data demand party and, after a model security assessment index is computed based on the plaintext model parameter, output a model parameter security assessment report to a data source party. According to the security assessment report, the data source party determines the model security and decides whether to deploy the model locally.

However, this traditional assessment solution has a major defect, i.e., the solution is based on the assumption that the trusted assessment party is a fully trusted third party. In the real world, however, even if the third party does not intend to have this happen, there are always various intruders trying to break through a security barrier of the trusted third party using various loopholes or back doors to steal various valuable data. Since the data demand party sends a model parameter as a plaintext to the trusted assessment party to compute the model security assessment index, once the security of the trusted assessment party is breached (for example, a Trojan program is implanted), the plaintext model parameter is likely to be secretly transmitted by the Trojan program to an intruder, resulting in exposing the model plaintext of the data demand party to the intruder without being noticed.

Alternatively, in another case, if the assessment party actually colludes with the data source party and leaks a model parameter plaintext of the data demand party to the data source party (this type of leakage is absolutely forbidden for the trusted assessment party under a normal state; yet, the possibility of a private conspiracy of internal staff in the trusted assessment party cannot be ruled out), and an encrypted model plaintext of the data demand party is also exposed to the data source party. In either case, the model security of the data demand party is seriously threatened. Therefore, the traditional model security deployment solution cannot properly address the problem of model security deployment.

On the other hand, with the development of the Internet and the emergence of the cloud computing concept, and the increasing demand in ciphertext search, electronic voting, mobile codes, multi-party computation and the like, homomorphic encryption has become increasingly important. Homomorphic encryption is a type of encryption method with a special natural property and is also a cryptographic technique based on the computational complexity theory for mathematical problems. Homomorphically encrypted data is processed to obtain an output, and then the output is decrypted. The result thereof is the same as an output result obtained through processing unencrypted original data using the same method. Compared with a common encryption algorithm, in addition to basic encryption operations, homomorphic encryption can also achieve multiple computation functions among ciphertexts; in other words, computation before decryption is equivalent to decryption before computation. In essence, homomorphic encryption is an encryption function in which the result of addition and multiplication operations are performed on a ring for a plaintext before encryption and the result of performing a corresponding operation on a ciphertext after encryption are the same. It is precisely the special natural property of homomorphic encryption that makes it possible to thoroughly resolve the conflict between security and privacy in deployment of a data model.

Before the solution of the specification is introduced in detail, a specific algorithm of homomorphic encryption is firstly explained to help those skilled in the art clearly recognize the special natural property of the homomorphic algorithm.

An encryption function with a homomorphic property is an encryption function in which two plaintexts a and b satisfy $Dec(En(a) \odot En(b)) = a \oplus b$, where En is an encryption operation, Dec is a decryption operation, and $\odot$ and $\oplus$ correspond to operations on plaintext and ciphertext domains respectively. When $\oplus$ represents addition, the encryption is referred to as additive homomorphic encryption; and when $\odot$ represents multiplication, the encryption is referred to as multiplicative homomorphic encryption. Fully homomorphic encryption is an encryption function that has both additive and multiplicative homomorphic properties at the same time and can perform any number of times of addition and multiplication operations. The function can be expressed in a mathematical formula, i.e., $Dec(f(En(m1), En(m2), \ldots, En(mk))) = f(m1, m2, \ldots, mk)$, or expressed as $f(En(m1), En(m2), \ldots, En(mk)) = En(f(m1, m2, \ldots, mk))$. If f is an arbitrary function, the function is referred to as fully homomorphic encryption.

The most frequently used homomorphic encryption algorithms are described below to ease the understanding. The most frequently used homomorphic encryption algorithms include an additive homomorphic Paillier algorithm, a multiplicative homomorphic Elgamal algorithm, and an LWE-based fully homomorphic algorithm. The homomorphic encryption algorithms are defined as below.

Let the encryption operation be $c = E(PK, m)$, and a decryption operation be $m = D(SK, d)$, where m is a plaintext, c is a ciphertext, SK is an encryption key, $E(,)$ is an encryption function, and $D(,)$ is a decryption function. The additive homomorphic encryption algorithm property: the following additive homomorphic operation can be achieved, and a scalar-multiplicative homomorphic operation can further be achieved through multiple additive homomorphic operations.

Additive homomorphic operation: HAdd(c1, c2)

Given ciphertexts c1 and c2 of plaintexts m1 and m2, i.e., $c1 = E(PK, m1)$ and $c2 = E(PK, m2)$. A ciphertext of $m1 + m2$ can be obtained through computation of c1 and c2; and the following formula holds:

$$HAdd(c1, c2) = E(PK, m1 + m2)$$

Scalar-multiplicative homomorphic operation: HSM(c1, m2)

Given a ciphertext c1 of a plaintext m1 and a plaintext m2, a ciphertext of $m1 \times m2$ can be obtained by performing m2 times of HAdd(,) operation on c1. For example, when $m2 = 3$, the following formula holds:

$$HSM(c1, m2) = HAdd(c1, HAdd(c1, HAdd(c1, c1))) = E(PK, m1 \times m2)$$

The multiplicative homomorphic encryption algorithm property: the following multiplicative homomorphic operation can be achieved:

Multiplicative homomorphic operation: HMul(c1, c2)

Given ciphertexts c1 and c2 of plaintexts m1 and m2, i.e., c1=E(PK,m1) and c2=E(PK,m2). A ciphertext of m1×m2 can be obtained through computation of c1 and c2; and the following formula holds:

$$HMul(c1,c2)=E(PK,m1\times m2).$$

Thus, in the above formula, the result of performing addition and multiplication operations on a ring for a plaintext before encryption is equivalent to that of performing a corresponding operation on a ciphertext after encryption. The use of this special natural property can help resolve the conflict between security and privacy in deployment of a data model. The above-described algorithms and formulas are all basic knowledge in the field of homomorphic encryption, which will not be elaborated herein.

After basic algorithms and meaning of homomorphic encryption are introduced, the specification is further described in detail below with reference to the accompanying drawings and examples so as to clearly describe the object, technical solutions and advantages of the specification.

Figure 2:
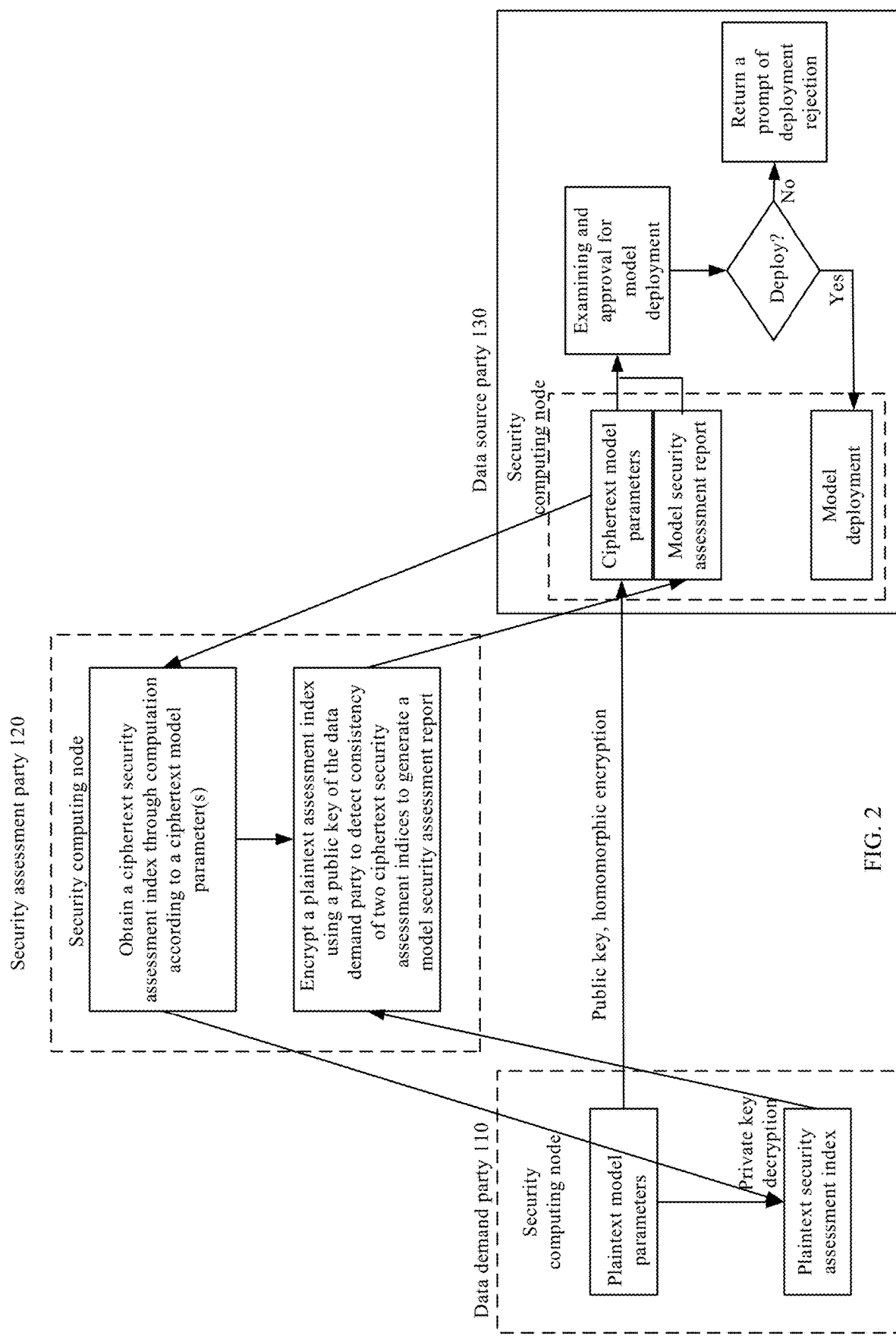
FIG. 2 is a security deployment assessment solution for encryption models according to an embodiment of the specification.

Firstly, FIG. 1 shows an exemplary operational computing environment according to an embodiment of the specification. The computing environment shown in FIG. 1 comprises a data demand party device 110 (referred to as "data demand party 110"), a security assessment party device 120 (referred to as "security assessment party 120"), and a data source party device 130 (referred to as "data source party 130"). The data demand party, the security assessment party, and the data source party may be composed of secure computing nodes, for example, personal computers, servers, clients, mobile devices (such as mobile phones, personal digital assistants, and tablet computers), and various computing devices. Data communication among all parties is performed through a network. The network comprises various types of wired and wireless networks, including, but not limited to, the Internet, a local area network, Wi-Fi, a WLAN, a cellular communication network (GPRS, CDMA or a 2G/3G/4G/5G cellular network), a satellite communication network, etc. Through the data communication network, the data demand party, the security assessment party, and the data source party can mutually transmit various data for processing. As shown in FIG. 2, a security deployment assessment solution for encryption models in an embodiment of the specification relates to data exchange among the three parties. In another embodiment, the solution may only relate to a data demand party 110 and a data source party 130, which is described in detail in FIG. 4 and FIG. 5.

After the exemplary operational computing environment of an embodiment of the specification in FIG. 1 is described, a model security deployment assessment mechanism that achieves higher security and robustness using homomorphic encryption is described in combination with the operational computing environment. FIG. 2 shows an overall solution for a model security deployment assessment, which is implemented among a data demand party 110, a security assessment party 120 and a data source party 130. Firstly, the data demand party 110 sends to the data source party 130 a deployment request for deploying a homomorphically-encrypted data model (such as a trained machine learning model) on the data source party 130, wherein the deployment request comprises one or more ciphertext model parameters that are generated based on encrypting, with homomorphic encryption, one or more plaintext parameters of the data model and a public key for encryption. Before initiating the deployment request, the data demand party 110 trains a data model using data from various sources as a model feature, and performs homomorphic encryption on the model parameter of the data model using a public key to obtain an encrypted data model (a ciphertext model). Note that in various embodiments, a linear regression model is used as an example of a machine learning model for description. However, it should be understood that the data model is not limited thereto, but is applicable to various types of data models, for example, other ciphertext models with the model results thereof being predicted probability values, such as a logistic regression data model, a regression decision tree data model, and other data models. In the context of the specification, an original data model may be alternatively referred to as a "plaintext model," and a homomorphically-encrypted data model may be alternatively referred to as a "ciphertext model." After receiving a request from the data demand party 110 that includes ciphertext model parameters and a public key, the data source party 130 shuffles the order of the ciphertext model parameters, and then transmits the order-shuffled ciphertext model parameters and the public key to the security assessment party 120, or directly transmits the ciphertext model parameters and the public key to the security assessment party 120. After obtaining the ciphertext model parameters and the public key, the security assessment party 120 obtains a first ciphertext security assessment index (in this embodiment, variance computation is used as an example) through computation using the ciphertext model parameters, and transmits the first ciphertext security assessment index to the data demand party 110. The data demand party 110 decrypts the received first ciphertext security assessment index using a private key corresponding to the public key to generate a plaintext security assessment index, and then returns the plaintext security assessment index to the security assessment party 120. The security assessment party 120 encrypts the received plaintext security assessment index using the public key previously provided by the data demand party 110 to generate a second ciphertext security assessment index, and compares the second ciphertext security assessment index with the first ciphertext security assessment index to determine consistency thereof. Afterwards, the security assessment party 120 generates a corresponding model security assessment report according to the consistency, and returns the model security assessment report to the data source party 130 for reference. Here, when the first ciphertext security assessment index is consistent with the second ciphertext security assessment index, a model security assessment report indicating that the ciphertext model is secure may be provided. Conversely, when the first ciphertext security assessment index is inconsistent with the second ciphertext security assessment index, a model security assessment report indicating that the ciphertext model is not secure (for example, the data demand party 110 may conduct falsification in the decryption process) may be provided. After receiving the model security assessment report from the security assessment party 120, the data source party 130 examines and approves the model deployment request according to the model security assessment report. That is, if the model security assessment report indicates that the ciphertext model is secure, deployment of the ciphertext model is approved; otherwise, deployment of the ciphertext model is rejected; and a prompt of deployment rejection may be returned to the data demand party 110. After it is examined and approved, the encrypted ciphertext model is deployed on the data source party 130. At this point, the solution ends.

In the solution of the specification, the security assessment party can only obtain a ciphertext model parameter in a ciphertext form, and thus there is no risk of the model parameter plaintext being leaked from the security assessment party. Meanwhile, after the data demand party decrypts a first ciphertext security assessment index into a plaintext security assessment index, the plaintext security assessment index is not directly sent to the data source party; instead, the security assessment party verifies the two security assessment indices before and after decryption by the data demand party, and then generates a model security assessment report, and finally returns the report to the data source party, thereby preventing the data demand party from conducting falsification in the decryption process (if the data demand party provides an encrypted ciphertext index, then according to the characteristics of the homomorphic encryption technology, the comparison of the first ciphertext security assessment index with the second ciphertext security assessment index at the security assessment party is not likely to yield a consistent result). This shows that the security deployment assessment solution for encryption models provided by the specification overcomes various defects existing in the traditional model security deployment solution, and provides a more secure and robust model security deployment assessment mechanism with improved performance.

Figure 3:
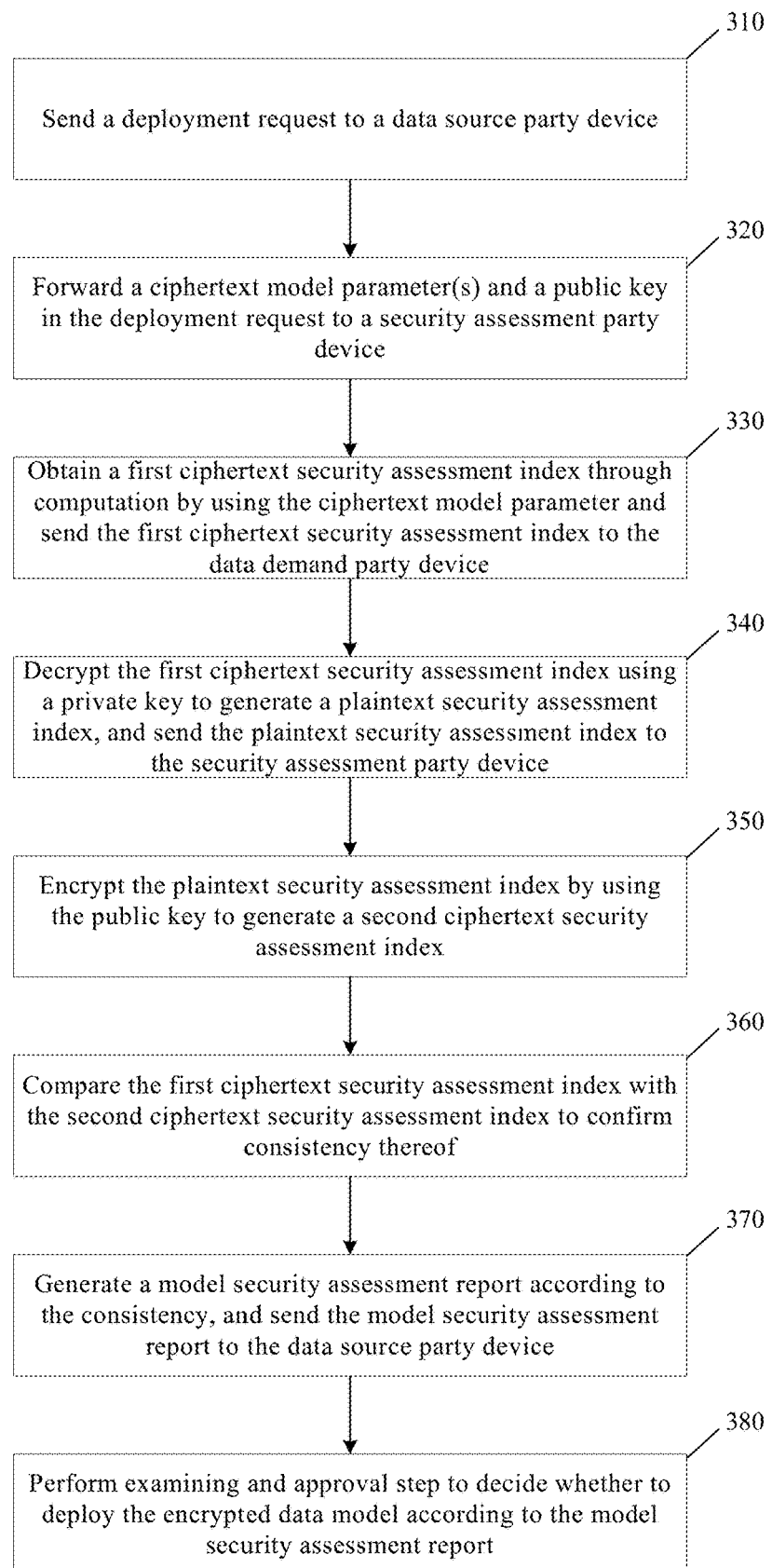
FIG. 3 is a flow chart of a security deployment assessment method for encryption models according to an embodiment of the specification.

After an overview of the security deployment assessment solution for encryption models provided by the specification is described, a flow chart of a model security deployment assessment method using homomorphic encryption according to an embodiment of the specification is shown in FIG. 3. The flow chart corresponds to the assessment solution shown in FIG. 2. The flow chart also relates to a data flow among a data demand party 110, a security assessment party 120 and a data source party 130.

Firstly, in step 310, the data demand party 110 generates an encryption key (public key PK) and a decryption key (private key SK) for homomorphic encryption, performs homomorphic encryption on model parameters to generate encrypted data models, and then sends to the data source party 130 a deployment request for deploying the homomorphically-encrypted data model on the data source party 130, wherein the deployment request comprises one or more ciphertext model parameters that are generated based on encrypting, with homomorphic encryption, one or more plaintext parameters of the data model and the public key PK for the homomorphic encryption. A specific model encryption process is as follows:

Algorithm input: k+1 model parameters of $a\_0, a\_1, \ldots, a\_k$.

Algorithm process: $c\_0 = E(PK, a\_0)$, $c\_1 = E(PK, a\_1), \ldots, c\_k = E(PK, a\_k)$.

Algorithm output: k+1 encrypted model parameters of $c\_0, c\_1, \ldots, c\_k$.

Here, it should be understood that the above-described algorithm example is merely a demonstration of a simple encryption process for the illustrative purpose. In reality, according to the characteristics of the asymmetric encryption technology, when the asymmetric encryption is used, a random number is further provided to a data assessment party along with the public key for security considerations, so as to enable that using same public key results in a consistent encryption result for the same data under the condition of the same random number. The "random number" is a frequently used security means for asymmetric encryption, which has little to do with the specification itself. The "random number" will thus be not elaborated further herein.

Afterwards, in step 320, after receiving the deployment request, the data source party 130 transmits the ciphertext model parameters (namely $c\_0, c\_1, \ldots, c\_k$, the order of which can be shuffled) and the public key (namely PK) to the security assessment party 120.

Next, in step 330, after obtaining the ciphertext model parameters and the public key, the security assessment party 120 obtains a first ciphertext security assessment index through computation using the ciphertext model parameters, and transmits the first ciphertext security assessment index to the data demand party 110. In the specification, a "security assessment index" is a statistical index, such as a variance (var) or a range computed according to the homomorphic property and using an encrypted model parameter. The use of the statistical index can prevent a situation in which a parameter of a certain feature in a model is much greater than those of other features. Parameters that are much greater than those of other features are likely to be "malicious" parameters used for reversely inferring a corresponding original value of the parameters. Therefore, the possible "malicious" parameter can be completely rendered useless through variance computation. In the embodiment, variance computation of the ciphertext model parameter is taken as an example in computing a security assessment index, and an algorithm of which is as follows:

Algorithm input: k+1 encrypted model parameters of $c\_0, c\_1, \ldots, c\_k$.

Algorithm process: a ciphertext (sample) variance index is: $\text{Var\_E} = \text{HAdd}(\text{HSM}(\text{HAdd}(\text{HMul}(c\_0, c\_0), \text{HMul}(c\_1, c\_1), \ldots, \text{HMul}(c\_k, c\_k)), 1/k), \text{HSM}(\text{HMul}(\text{HAdd}(c\_0, c\_1, \ldots, c\_k), \text{HAdd}(c\_0, c\_1, \ldots, c\_k)), -1/(k*(k+1))))$.

As previously described, HAdd( ) represents an additive homomorphic operation, HSM( ) represents a scalar-multiplicative homomorphic operation, and HMul( ) represents a multiplicative homomorphic operation.

In step 340, the data demand party 110 decrypts a ciphertext parameter in the received first ciphertext model security assessment index using the private key SK corresponding to the public key to generate a plaintext security assessment index (Var=D(SK, Var_E)), and sends the plaintext security assessment index to the security assessment party 120.

In step 350, the security assessment party 120 encrypts the received plaintext security assessment index using the public key PK provided by the data demand party 110 to generate a second ciphertext security assessment index:

$$\text{Var\_E2} = E(PK, \text{Var}).$$

As previously described, Var represents a variance, E(,) is an encryption function, D(,) is a decryption function, SK is the private key, and PK is the public key.

In step 360, the security assessment party 120 compares the first ciphertext security assessment index (generated in step 330) with the second ciphertext security assessment index to determine consistency thereof, namely comparing Var_E with Var_E2. Here, if the data demand party 110 intends to maliciously elicit detailed data of the data source party by falsifying a model parameter, the fake model parameter inevitably leads to a change in a plaintext parameter of the generated plaintext security assessment index when the data demand party 110 performs decryption with the private key SK, which in turn leads to the Var_E2 generated through encryption based on the plaintext parameter at the security assessment party 120 to be inconsistent with the Var_E. Such inconsistency reveals that the data demand party 110 conducts falsification during the decryption in step 340.

In step 370, the security assessment party 120 generates a corresponding model security assessment report based on the consistency and returns the model security assessment report to the data source party 130 for reference. Here, when the first ciphertext security assessment index is consistent with the second ciphertext security assessment index, a model security assessment report indicating that the data model is secure may be provided. Conversely, when the first ciphertext security assessment index is inconsistent with the second ciphertext security assessment index, a model security assessment report indicating that the data model is not secure (for example, the data demand party 110 may conduct falsification in the decryption process) may be provided.

Finally, in step 380, the data source party 130 examines and approves the model deployment request according to the received model security assessment report. That is, if the model security assessment report indicates that the encrypted ciphertext model is secure, deployment of the ciphertext model is approved; otherwise, deployment of the ciphertext model is rejected; and a prompt of deployment rejection may be returned to the data demand party 110. After the deployment is approved, the encrypted ciphertext model is deployed on the data source party 130.

At this point, the entire process of the assessment method ends. It should be understood that the homomorphic encryption and decryption algorithms involved in the specification use some parameters, functions, and formulas in the frequently used homomorphic encryption and decryption algorithms. The parameters, functions, and formulas are common knowledge in homomorphic encryption, which will not be elaborated herein. The above-described example algorithms are provided for the illustrative purpose only, and are not intended to limit the homomorphic encryption, decryption, and computation of the specification. In reality, those skilled in the art may choose any other suitable homomorphic encryption, decryption, and computation algorithms according to practical needs.

In one embodiment, after a variance Var_E is generated based on the ciphertext model parameter in step 330, the variance may further be compared with a set threshold. If the variance exceeds the threshold, a model is determined as insecure because the model parameter may be a falsified parameter for attacking the model.

In one embodiment, a comprehensive security level assessment report is provided. That is, during the process of generating the report, there may be a plurality of assessments, and then a plurality of first ciphertext security assessment indices and second ciphertext security assessment indices are provided at the same time. Through a comprehensive consideration of the comparison results (for example, scoring) of the first ciphertext security assessment indices and the second ciphertext security assessment indices, a more accurate comprehensive security level assessment report can be obtained. In one example, the data source party 130 may request the data demand party 110 to send a deployment request repeatedly at different times and send an encrypted model parameter and a public key in each deployment request to the security assessment party 120. Similarly, the security assessment party 120 is alternatively configured to, after computing the encrypted model parameter each time to generate a first security assessment index, send the first security assessment index to the data demand party 110; and after receiving a plaintext security assessment index decrypted by the data demand party 110, the security assessment party 120 encrypt the plaintext security assessment index using a public key, so as to generate a corresponding second ciphertext security assessment index, and compare the second ciphertext security assessment index with the corresponding first security assessment index. Afterwards, results of the comparisons are integrated, and a comprehensive security level assessment report is generated. The integration may comprise giving an insecure assessment when one of the results of the comparisons exceeds a threshold, or obtaining a total security score after weighted averaging of all the results and adding the score to the report to be fed back to the data source party 130, or the like. In another embodiment, in step 340 in which the data demand party 110 decrypts a ciphertext parameter in the received ciphertext model security assessment index to generate a plaintext security assessment index, before sending the plaintext security assessment index to the security assessment party 120, the data demand party can perform the examining and approval step by comparing the decrypted variance Var and the Var computed according to the plaintext, so as to determine whether someone has falsified the Var_E from a varied encrypted model parameter and provide the falsified one to the data demand party 110 for decryption. Through the examining and approval step, such falsifying behaviors can be spotted to avoid leaking the model parameter.

In other embodiments, the model security assessment solution can also be used in the model result assessment after an encrypted data model is deployed on a data source party, so as to assess whether a risk of reversely inferring a detailed data value of the data source party exists in a plaintext model result provided by the data demand party 110. A large amount of valuable data is stored on the data source party. Therefore, if the detailed data value input by the data source party can be easily inferred by the plaintext model result provided by the data model from the data demand party 110, it means that the data demand party 110 may set a specific model parameter to perform inverse inference. As such, the model security assessment solution of the specification can be used to check the deployed encrypted data model to determine whether there is a risk of inverse inference. Since the process is similar, it will not be elaborated further herein.

In addition, as previously described, in an asymmetric encryption process, a random number is further provided along with the public key to enable that using same public key results in a consistent encryption result for the same data under the condition of the same random number. Therefore, the above-described steps involving the public key actually comprise processing of the random number. However, the "random number" is a frequently used security means for asymmetric encryption.

Figure 4:
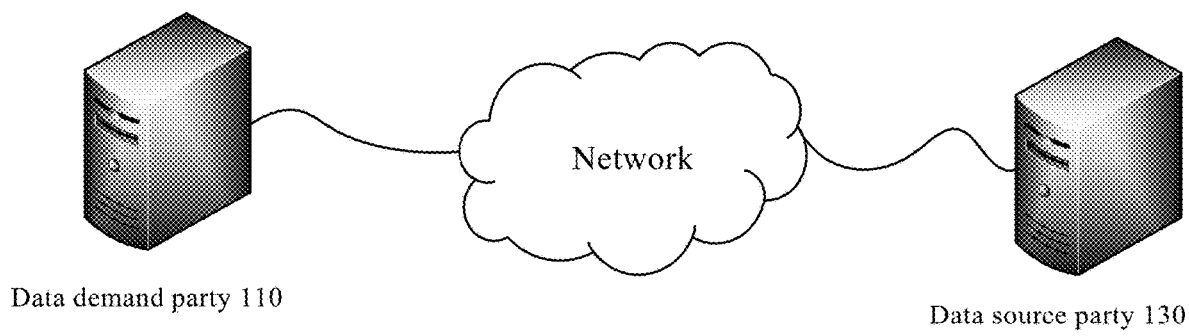
FIG. 4 shows another exemplary operational computing environment of the specification.

What is mainly described above is a model security deployment assessment mechanism among a data demand party, a security assessment party, and a data source party. According to another embodiment of the specification, a model security deployment assessment mechanism that achieves higher security and robustness using homomorphic encryption is also provided. FIG. 4 shows an exemplary operating environment for model security deployment assessment, which is implemented between a data demand party 110 and a data source party 130 under the condition where a security assessment party is not required. In the exemplary operating environment, the data demand party 110 and the data source party 130 communicate directly and bidirectionally through a network, without the participation of a security assessment party.

Figure 5:
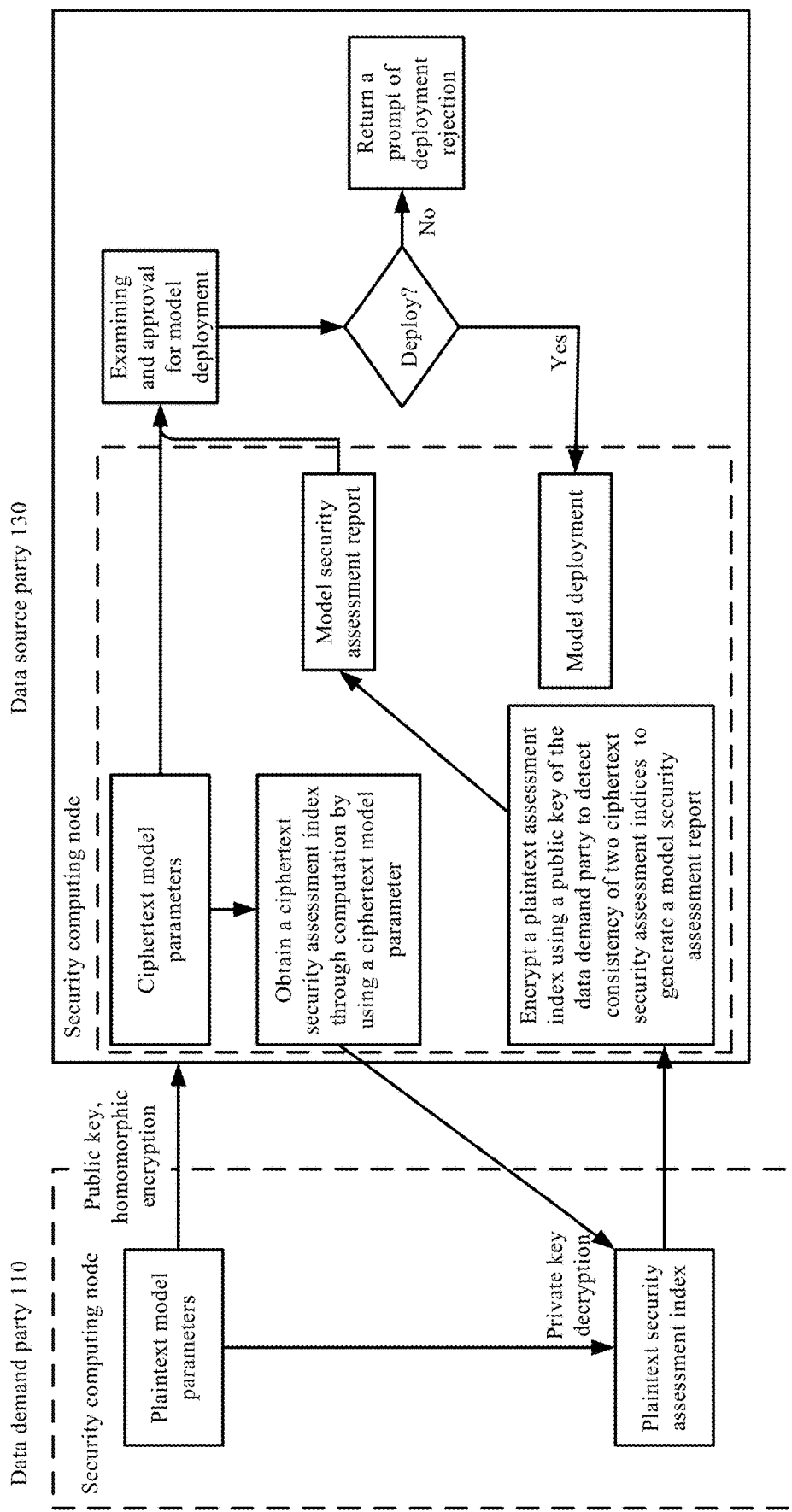
FIG. 5 is a security deployment assessment solution for encryption models according to another embodiment of the specification.

A security deployment assessment solution for encryption models according to another embodiment of the specification is shown in FIG. 5.

Firstly, a data demand party 110 sends to a data source party 130 a deployment request for deploying a homomorphically-encrypted data model (such as a trained machine learning model) on the data source party 130, wherein the deployment request comprises one or more ciphertext model parameters that are generated based on encrypting, with homomorphic encryption, one or more plaintext parameters of the data model and a public key for encryption. After receiving the request comprising the ciphertext model parameter and the public key from the data demand party 110, the data source party 130 obtains a first ciphertext security assessment index through computation using the ciphertext model parameter, and sends the first ciphertext security assessment index to the data demand party 110. The data demand party 110 decrypts the received ciphertext model security assessment index using a private key corresponding to the public key to generate a plaintext security assessment index and forwards the plaintext security assessment index to the data source party 130. The data source party 130 encrypts the received plaintext security assessment index using the public key provided by the data demand party 110, so as to generate a second ciphertext security assessment index, and compares the second ciphertext safety assessment index with the first ciphertext safety assessment index to determine consistency thereof. Afterwards, the data source party 130 generates a corresponding model security assessment report according to the consistency. When the first ciphertext security assessment index is consistent with the second ciphertext security assessment index, a model security assessment report indicating that the data model is secure may be provided. Conversely, when the first ciphertext security assessment index is inconsistent with the second ciphertext security assessment index, a model security assessment report indicating that the data model is not secure (for example, the data demand party 110 may conduct falsification in the decryption process) may be provided. Afterwards, the data source party 130 examines and approves the model deployment request according to the model security assessment report. That is, if the model security assessment report indicates that the encrypted ciphertext model is secure, deployment of the ciphertext model is approved; otherwise, deployment of the ciphertext model is rejected; and a prompt of deployment rejection may be returned to the data demand party 110. After the step of examining and approval, the encrypted ciphertext model is deployed on the data source party 130. At this point, the solution ends.

The generation of the model security assessment report facilitates the archiving of the report for future use. That is, if the model security assessment report indicates that a data model from the data demand party 110 is insecure, when a subsequent deployment request from the same data demand party 110 is received later, the previously-generated model security assessment report stored in association with the data demand party 110 can be directly looked up, so as to directly reject the subsequent deployment request from the data demand party 110 and save resources.

Therefore, in one embodiment, the step of generating the security assessment report may be alternatively omitted, and the model deployment request may be examined and approved directly based on the comparison result of the first ciphertext security assessment index and the second ciphertext security assessment index. That is, if the first ciphertext security assessment index is consistent with the second ciphertext security assessment index, deployment of the ciphertext model is approved; and conversely, if the first ciphertext security assessment index is inconsistent with the second ciphertext security assessment index, deployment of the ciphertext model is rejected.

In the solution of the specification, the data source party 130 can only obtain a model parameter in a ciphertext form, and thus there is no risk of leaking a model parameter plaintext. Meanwhile, after the data demand party 110 decrypts a first ciphertext security assessment index, the data source party 130 encrypts a plaintext security assessment index using a public key to generate a second ciphertext security assessment index, verifies the two security assessment indices before and after decryption by the data demand party, and generates a model security assessment report, thereby preventing the data demand party from conducting falsification in the decryption process (if a falsified index is provided, then according to the characteristics of the homomorphic encryption technology, the two ciphertext security assessment indices are not possible to be consistent with each other). This shows that the security deployment assessment solution for encryption models provided by the specification overcomes various defects existing in the traditional model security deployment solution, and provides a more secure and robust model security deployment assessment mechanism with improved performance.

Figure 6:
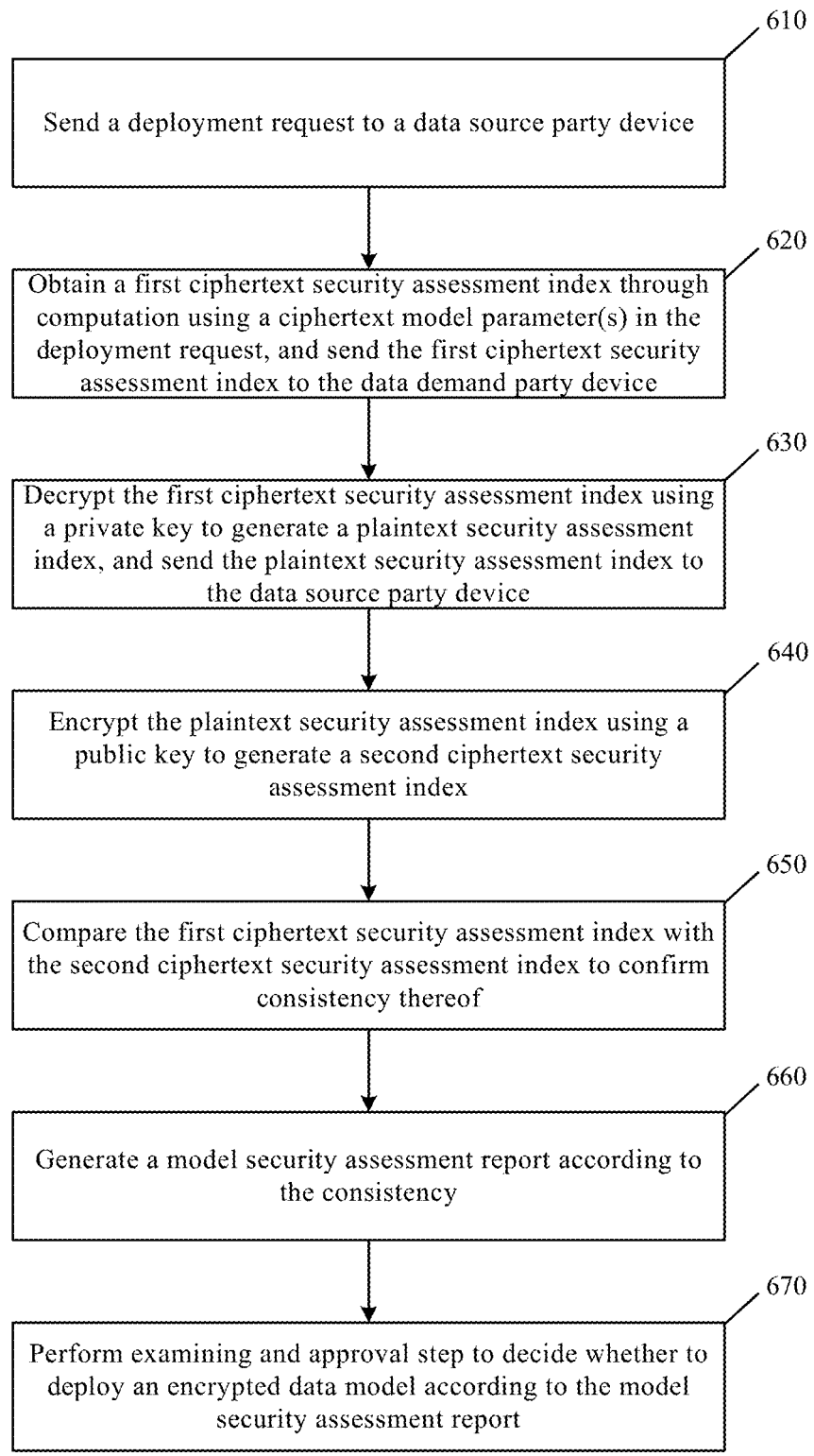
FIG. 6 is a flow chart of a security deployment assessment method for encryption models according to another embodiment of the specification.

After an overview of a security deployment assessment solution for encryption models provided by another embodiment of the specification is given, a flow chart of a model security deployment assessment method using homomorphic encryption according to another embodiment of the specification is shown in FIG. 6. The flow chart relates to a data flow between a data demand party 110 and a data source party 130. Herein, the content, definition, and description similar to those in FIG. 3 will not be described again in detail.

Firstly, in step 610, the data demand party 110 generates an encryption key (public key PK) and a decryption key (private key SK) for homomorphic encryption, performs homomorphic encryption on a model parameter to generate an encrypted data model, and then sends to a data source party 130 a deployment request for deploying the homomorphically-encrypted data model on the data source party 130, wherein the deployment request comprises one or more ciphertext model parameters that are generated based on encrypting, with homomorphic encryption, one or more plaintext parameters of the data model and the public key PK for encryption. A specific encryption process is as follows:

Algorithm input: k+1 model parameters of $a\_0, a\_1, \ldots, a\_k$.

Algorithm process: $c\_0 = E(PK, a\_0)$, $c\_1 = E(PK, a\_1), \ldots, c\_k = E(PK, a\_k)$.

Algorithm output: k+1 encrypted model parameters of $c\_0, c\_1, \ldots, c\_k$.

Then, in step 620, after receiving the deployment request, the data source party 130 obtains a first ciphertext security assessment index through computation using the ciphertext model parameter and sends the first ciphertext security assessment index to the data demand party 110. The computation index may be a statistical index, such as a range or a variance computed according to a homomorphic property and using an encrypted model parameter, so as to prevent a parameter of a certain feature in a model from being much greater than those of other features. Parameters that are much greater than those of other features are likely to be "malicious" parameters used for reversely inferring a corresponding original value of the parameters. Taking the variance as an example, the algorithm of the variance is as follows:

Algorithm input: k+1 encrypted model parameters of c_0, c_1, . . . c_k.

Algorithm process: a ciphertext (sample) variance index is: Var_E=HAdd(HSM(HAdd(HMul(c_0, c_0), HMul(c_1, c_1), . . . , HMul(c_k, c_k)), 1/k), HSM(HMul(HAdd(c_0, c_1, . . . , c_k), HAdd(c_0, c_1, . . . , c_k)),-1/(k*(k+1))).

In step 630, the data demand party 110 decrypts a ciphertext parameter in the received first ciphertext model security assessment index using the private key SK corresponding to the public key to generate a plaintext security assessment index (Var=D(SK,Var_E), and returns the plaintext security assessment index to the data source party 130.

In step 640, the data source party 130 encrypts the received plaintext security assessment index using the public key PK provided by the data demand party 110 to generate a second ciphertext security assessment index Var_E2=E (PK,Var).

In step 650, the data source party 130 compares the first ciphertext security assessment index (generated in step 620) with the second ciphertext security assessment index to determine consistency thereof, namely comparing Var_E with Var_E2. If the data demand party 110 intends to maliciously elicit detailed data of the data source party by falsifying a model parameter, the falsification conducted during the decryption inevitably leads to a change in a plaintext parameter of the plaintext security assessment index, which in turn leads to the Var_E2 generated based on the plaintext parameter to be inconsistent with the previously computed. Var_E. Such inconsistency reveals that the data demand party 110 conducts falsification during the decryption.

In step 660, the data source party 130 generates a corresponding model security assessment report based on the consistency. When the first ciphertext security assessment index is consistent with the second ciphertext security assessment index, a model security assessment report indicating that the data model is secure may be provided. Conversely, when the first ciphertext security assessment index is inconsistent with the second ciphertext security assessment index, a model security assessment report indicating that the data model is not secure (for example, the data demand party 110 may conduct falsification in the decryption process) may be provided.

Finally, in step 670, the data source party 130 examines and approves the model deployment request according to the model security assessment report. That is, if the model security assessment report indicates that the encrypted ciphertext model is secure, deployment of the ciphertext model is approved; otherwise, deployment of the ciphertext model is rejected; and a prompt of deployment rejection may be returned to the data demand party 110. After the step of examining and approval, the encrypted ciphertext model is deployed on the data source party 130.

In one embodiment, a comprehensive security level assessment report is provided. That is, during the generation of the report, there may be a plurality of assessments, and then a plurality of first ciphertext security assessment indices and second ciphertext security assessment indices are provided at the same time. Through a comprehensive consideration of the comparison results of the first ciphertext security assessment indices and the second ciphertext security assessment indices (for example, performing weighted summation, and filtering the maximum and minimum differences), a more accurate comprehensive security level assessment report can be obtained. In one example, the data source party 130 may require the data demand party 110 to send a deployment request repeatedly at different times; when receiving the deployment request each time, the data source party 130 computes an encrypted model parameter to generate a first security assessment index and send the first security assessment index to the data demand party 110; and when receiving a plaintext security assessment index decrypted by the data demand party 110, the data source party 130 encrypts the plaintext security assessment index using the public key to generate a corresponding second ciphertext security assessment index, and compare the second ciphertext security assessment index with the corresponding first security assessment index. Afterwards, the data source party 130 integrate the comparison results and then generates a comprehensive security level assessment report. The integration may comprise giving an insecure assessment when one of the comparison results exceeds a threshold or obtaining a total security score after weighted averaging of all the results and adding the score to the report for security feedback, or the like.

In another embodiment, in step 340 in which the data demand party 110 decrypts a ciphertext parameter in the received ciphertext model security assessment index to generate a plaintext security assessment index, before sending the plaintext security assessment index to the security assessment party 120, the data demand party can perform the step of examining and approval by comparing the decrypted variance Var and the Var computed according to the plaintext, so as to determine whether someone has falsified the Var_E from a varied encrypted model parameter and provide the falsified one to the data demand party 110 for decryption. Through the examining and approval step, such falsifying behaviors can be spotted to avoid leaking the model parameter.

In addition, as previously described, in an asymmetric encryption process, a random number is further provided along with the public key to enable that using same public key results in a consistent encryption result for the same data under the condition of the same random number. Therefore, the above-described steps involving the public key actually comprise processing of the random number. However, the "random number" is a frequently used security means for asymmetric encryption.

In another embodiment described above, the data source party may replace the security assessment party to complete the generation and comparison of the first and second key security indices, and the generation of a model security assessment report. In this way, various potential security issues that may be caused by the existence of the security assessment party are further avoided, and accordingly, the security assessment report is more credible. Therefore, various defects in the traditional model security deployment solution can be also overcome, and a more secure and robust model security deployment assessment mechanism with improved performance can be provided.

Although different embodiments are described above, it should be understood that the embodiments are provided as examples rather than limitations. Those skilled in the related art will understand that various modifications may be made in form and detail without departing from the spirit and scope of the specification as defined by the attached claims. Therefore, the breadth and scope of the specification provided herein should not be limited by the above-described exemplary embodiments but should be defined only in accordance with the attached claims and equivalents thereof.

What is claimed is:

1. A method for security assessment of encryption models, the method comprising:

a first device training a data model and performing homomorphic encryption on one or more plaintext model parameters of the data model to obtain ciphertext model parameters of the data model, and shuffling the ciphertext model parameters of the data model to change an order of the ciphertext model parameters of the data model;

the first device sending to a second device a deployment request for deploying a homomorphically-encrypted data model on the second device, wherein the deployment request comprises the shuffled ciphertext model parameters of the data model and a public key for the homomorphic encryption;

the second device obtaining a first ciphertext security assessment index through computation using the shuffled ciphertext model parameters, wherein the first ciphertext security assessment index is obtained by calculating a variance of the shuffled ciphertext model parameters, and sending the first ciphertext security assessment index to the first device;

the first device decrypting the received first ciphertext security assessment index using a private key corresponding to the public key to generate a plaintext security assessment index, and forwarding the plaintext security assessment index to the second device; and the second device encrypting the plaintext security assessment index using the public key to generate a second ciphertext security assessment index, comparing the first ciphertext security assessment index with the second ciphertext security assessment index to determine consistency thereof, and determining whether to deploy the homomorphically-encrypted data model according to the comparing.

2. The method according to claim 1, further comprising:
the second device generating a model security assessment report for determining whether to deploy the homomorphically-encrypted data model based on comparison results of a plurality of first ciphertext security assessment indices and a plurality of second ciphertext security assessment indices.

3. The method according to claim 1, wherein the deployment request further comprises a random number such that using the public key with the random number results in a consistent encryption result for the same data.

4. The method according to claim 1, further comprising:
the second device denying the deployment request in response to determining that the first ciphertext security assessment index and the second ciphertext security assessment index are not consistent.

5. The method according to claim 1, further comprising:
the second device deploys the homomorphically-encrypted data model in response to determining that the first ciphertext security assessment index and the second ciphertext security assessment index are consistent.

6. A method for security assessment of encryption models, the method comprising:

a first device training a data model and performing homomorphic encryption on one or more plaintext model parameters of the data model to obtain ciphertext model parameters of the data model, and shuffling the ciphertext model parameters of the data model to change an order of the ciphertext model parameters of the data model;

the first device sending to a second device a deployment request for deploying a homomorphically-encrypted data model on the second device, wherein the deployment request comprises the shuffled ciphertext model parameters of the data model and a public key for the homomorphic encryption;

the second device forwarding the shuffled ciphertext model parameters and the public key to a security assessment device;

the first device obtaining a first ciphertext security assessment index that is generated by the security assessment device using the shuffled ciphertext model parameters and the public key, wherein the first ciphertext security assessment index is obtained by calculating a variance of the shuffled ciphertext model parameters, decrypting the first ciphertext security assessment index using a private key corresponding to the public key to generate a plaintext security assessment index, and forwarding the plaintext security assessment index to the security assessment device;

the second device obtaining a model security assessment report from the security assessment device, wherein the model security assessment report is generated by the security assessment device encrypting the plaintext security assessment index using the public key to generate a second ciphertext security assessment index and comparing the first ciphertext security assessment index with the second ciphertext security assessment index to determine consistency thereof; and the second device determining whether to deploy the homomorphically-encrypted data model according to the model security assessment report.

7. The method according to claim 6, wherein:
the security assessment device is configured for generating a comprehensive model security assessment report for the second device to determine whether to deploy the homomorphically-encrypted data model by considering comparison results of a plurality of first ciphertext security assessment indices and a plurality of second ciphertext security assessment indices.

8. The method according to claim 6, wherein the deployment request further comprises a random number such that using the public key with the random number results in a consistent encryption result for the same data.

9. The method according to claim 6, further comprising:
the second device denying the deployment request in response to that the model security assessment report indicates that the first ciphertext security assessment index and the second ciphertext security assessment index are not consistent.

10. The method according to claim 6, further comprising:
the second device deploys the homomorphically-encrypted data model in response to that the model security assessment report indicates that the first ciphertext security assessment index and the second ciphertext security assessment index are consistent.

11. One or more non-transitory computer-readable storage media storing instructions executable by one or more processors to cause the one or more processors to perform operations including:

a first device training a data model and performing homomorphic encryption on one or more plaintext model parameters of the data model to obtain ciphertext model parameters of the data model, and shuffling the ciphertext model parameters of the data model to change an order of the ciphertext model parameters of the data model;

the first device sending to a second device a deployment request for deploying a homomorphically-encrypted data model on the second device, wherein the deployment request comprises the shuffled ciphertext model parameters of the data model and a public key for the homomorphic encryption;

the second device obtaining a first ciphertext security assessment index through computation using the shuffled ciphertext model parameters, wherein the first ciphertext security assessment index is obtained by calculating a variance of the shuffled ciphertext model parameters, and sending the first ciphertext security assessment index to the first device;

the first device decrypting the received first ciphertext security assessment index using a private key corresponding to the public key to generate a plaintext security assessment index, and forwarding the plaintext security assessment index to the second device; and the second device encrypting the plaintext security assessment index using the public key to generate a second ciphertext security assessment index, comparing the first ciphertext security assessment index with the second ciphertext security assessment index to determine consistency thereof, and determining whether to deploy the homomorphically-encrypted data model according to the comparing.

12. The one or more non-transitory computer-readable storage media according to claim 11, wherein the operations further comprise:

the second device generating a comprehensive model security assessment report for determining whether to deploy the homomorphically-encrypted data model by comprehensively considering comparison results of a plurality of first ciphertext security assessment indices and a plurality of second ciphertext security assessment indices.

13. The one or more non-transitory computer-readable storage media according to claim 11, wherein the deployment request further comprises a random number such that using the public key with random number results in a consistent encryption result for the same data.

14. The one or more non-transitory computer-readable storage media according to claim 11, wherein the operations further comprise:

the second device denying the deployment request in response to that the model security assessment report indicates that the first ciphertext security assessment index with the second ciphertext security assessment index are not consistent.

15. The one or more non-transitory computer-readable storage media according to claim 11, wherein the operations further comprise:

the second device deploys the homomorphically-encrypted data model in response to that the model security assessment report indicates that the first ciphertext security assessment index and the second ciphertext security assessment index are consistent.

* * * * *